United States Patent [19]

Jones et al.

[11] 4,074,043

[45] Feb. 14, 1978

[54] PURIFICATION OF TAMARIND GUM

[75] Inventors: Duane A. Jones, Minneapolis, Minn.; Wesley A. Jordan, Dallas, Tex.

[73] Assignee: General Mills Chemicals, Inc., Minneapolis, Minn.

[21] Appl. No.: 666,994

[22] Filed: Mar. 15, 1976

[51] Int. Cl.² ............................................. C08B 37/00
[52] U.S. Cl. ...................................... 536/52; 536/114
[58] Field of Search ........................ 260/209 R; 536/52

[56] References Cited
U.S. PATENT DOCUMENTS 3,399,189  8/1968  Gordon .............................. 260/209 R

OTHER PUBLICATIONS

Hall, et al., "Leaves for Food", Chem. Abst. vol. 84, 1974, parag. 178481e.
Remington's "Practice of Pharmacy", 12 ed. 1961 Mack Publ. Co., Easton, Pa., chapter 13.

Primary Examiner—Lewis Gotts
Assistant Examiner—Cary Owens
Attorney, Agent, or Firm—Forrest L. Collins

[57] ABSTRACT

Air classification of finely ground crude tamarind gum provides a purified tamarind seed polysaccharide. The crude gum may also be admixed with finely divided siliceous matter or may be defatted prior to air classification to increase the degree of purification.

9 Claims, 3 Drawing Figures

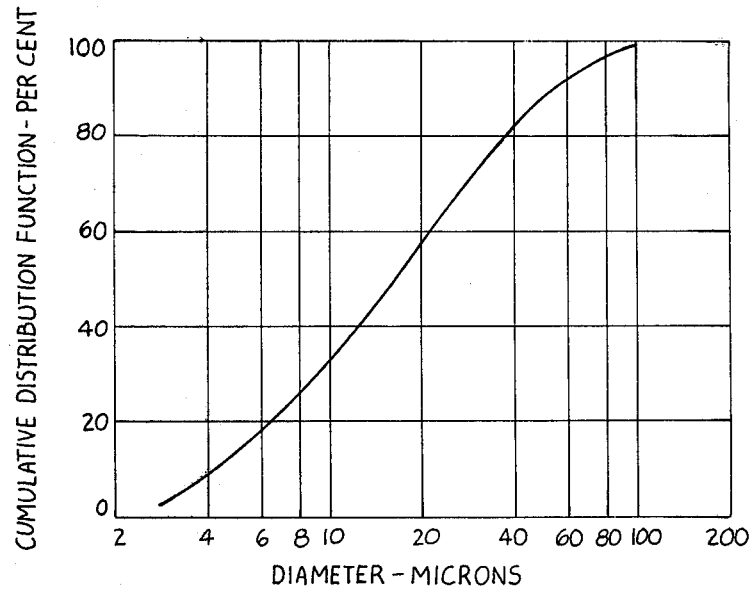
FIG. I
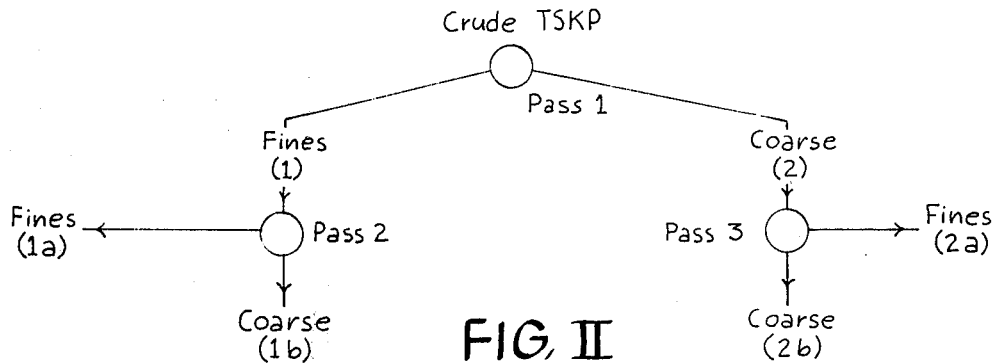
FIG. II
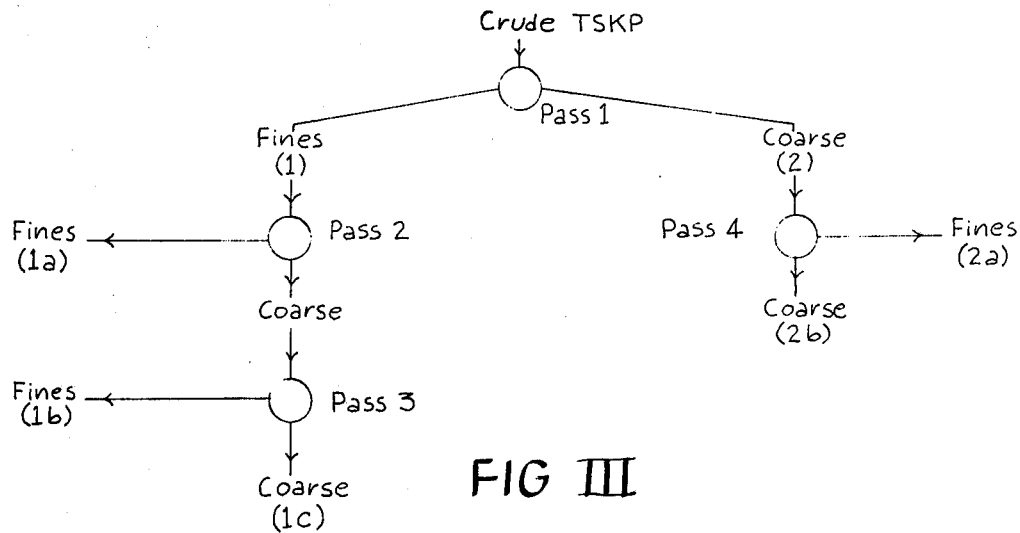
FIG III

PURIFICATION OF TAMARIND GUM

BACKGROUND OF THE INVENTION

The present invention relates to tamarind seed gum and, more particularly, to a method for upgrading the crude seed gum.

Tamarind seed gum, with a polysaccharide content of 45-55%, has long been recognized as a potential industrial polysaccharide source. Tamarind gum may be used as an inexpensive textile size, a paper strengthening agent, as well as, a substitute for other gums in various uses. Wide application of the seed gum, more specifically, tamarind seed kernel powder, (hereinafter TSKP), has been limited to date, however, because of the presence of the non-polysaccharide portion. The following is the typical composition of crude TSKP.

| Non-Polysaccharide Components | about 45-55% |
|---|---|
| Protein | 17-19% |
| Moisture | 8-10 |
| Fat | 7-8 |
| Fiber | 3-5 |
| Ash | 2-4 |
| Tannin | 2-3 |
| Free Sugars | 2-3 |
| Mechanical Impurities[1] | 0-5 |

[1]The term "Mechanical Impurities" as used herein, will mean such materials as sand, dirt, seed hulls, stems and the like.
Polysaccharide (by difference) .... about 55-45%. In some instances the polysaccharide content may be somewhat higher such as 65% and above, particularly if the moisture and/or fat content is reduced.

Presence of the large non-polysaccharide fraction — chiefly protein, fat and fiber — is undesirable because it contributes little or nothing to intended applications and it can interfere with or complicate product handling and use. For example, fat in TSKP makes the product tacky and non-free flowing. As a result, such TSKP is difficult to convey and difficult to disperse. Protein in TSKP may produce foam during dispersion in aqueous systems and is prone to solution denaturation with resultant formation and precipitation of insolubles. These materials, as well as, the water-insoluble fiber in TSKP can build up in the processing equipment and necessitate periodic shut-down for removal.

A number of purification processes have been devised to upgrade the crude gum and reduce the various use disadvantages. In general, these processes fall into two classifications: aqueous and non-aqueous processes.

Aqueous processes attempt to selectively remove polysaccharide or protein from the crude TSKP. Such processes have not been completely satisfactory because no totally selective extractant has been found for either tamarind polysaccharide or tamarind protein. Further complicating these processes is the fact that selective removal of protein, even if complete, would leave fat, fiber and other non-polysaccharide residue in TSKP. Also, tamarind polysaccharide significantly thickens aqueous extracts. Thus, polysaccharide extraction processes must be conducted at low TSKP concentrations (typically, about one percent) to permit physical separation of fractions. Recovery of product, such as by alcohol precipitation or by drying, is difficult and expensive because of the large volumes that must be processed.

Non-aqueous processes attempt to take advantage of differing TSKP component densities in order to separate the components in organic solvents. Here also, separation is not complete nor selective. A further disadvantage of these processes is that the use of flammable solvents is necessary. These solvents represent a potential health and safety hazard and necessitate the use of costly explosion-proof equipment in explosion-proof areas.

IN THE DRAWINGS

FIG. I shows a desirable particle size distribution for use in the present invention;

FIG. II shows schematically one preferred method of upgrading TSKP; and

FIG. III shows schematically another preferred method of upgrading TSKP.

THE PRESENT INVENTION

The present purification process overcomes the aforementioned process disadvantages and provides a simple, rapid, versatile and economical process for upgrading crude TSKP. The present process involves grinding the crude TSKP to a very fine powder followed by air classification. Processing in this manner reduces the protein content of TSKP about 50 percent together with major reduction in the amount of fiber and inert impurities and produces a substantially more useful product. For example, a 3 percent cooked aqueous dispersion (i.e., heated to 75° C.) of air classified TSKP (upgraded as described in Example I) had a viscosity of 3800 centipoise (hereinafter cps) while a 3 percent cooked aqueous dispersion (i.e., heated to 75° C.) of crude unclassified TSKP had a viscosity of 1900 cps — both measured with a Brookfield viscometer.

Alternatively, a dry-flow additive such as powdered silica can be added prior to air classification, or, TSKP can be solvent defatted prior to air classification to increase efficiency of the air classification purification process. Processing of TSKP by solvent defatting and air classification (as described in Example V) has been found to reduce protein content by about 75 percent and afford a product of high purity and performance. The terms "percent", "parts" and the like, as used herein, will mean percent, parts and the like "by weight" unless otherwise designated. Chemical analyses of this product is shown below with those for crude TSKP and air classified crude TSKP. This comparison illustrates the efficiency of the present purification process in these two alternatives.

| | CHEMICAL ANALYSES | | |
|---|---|---|---|
| | | Air Classified[a] Product | |
| % Content (Ave.) | Crude TSKP | Crude TSKP | Defatted TSKP |
| Polysaccharide | 44 | 73 | 82.3 |
| Protein | 18 | 9 | 4 |
| Moisture | 9 | 7.5 | 8.5 |
| Fat | 7 | 5 | 0.2 |
| Fiber | 4 | 1 | 1 |
| Ash | 3 | 2.5 | 2 |
| Mechanical Impurities | 3 | 0-2 | 0-2 |
| Viscosity[b] 3% (MFB) in cps (after heating to 75° c.) | 1900 | 3800 | 7000 |

[a]Air classified with a Walther, Model 150, laboratory air classifier at a secondary air velocity of about 30 cubic meters per hour.
[b]Measured with the Brookfield Model RVT Viscometer at 20 rpm, No. 4 spindle and 25° C. MFB means moisture free basis.

DETAILED DESCRIPTION OF THE INVENTION

The present purification process is based on two discoveries:

1. that tamarind polysaccharide (or polysaccharides) contained in the seed kernel can be appreciably separated from other components therein by subjection of finely ground TSKP to a centrifugal force such as that which may be obtained in a centrifugal vortex air classifier;

2. that air classification purification of crude TSKP is facilitated by admixture with powdered silica and/or by solvent defatting prior to air classification.

In one preferred embodiment, the present process consists of three steps: solvent defatting, grinding, and air classification. Solvent defatting can be conducted with typical fat extractants such as liquid (at room temperature) $C_6$ through $C_8$ aliphatic and aromatic hydrocarbons, $C_1$, $C_2$ or above halogenated lower hydrocarbons and $C_1$ through $C_5$ mono or di-hydroxy alcohols. Preferred solvents because of their utility, cost and availability are ethylene dichloride, heptane and toluene. Typically, crude TSKP is suspended in the solvent for a time sufficient to extract fat, mechanically recovered (such as by filtration or centrifugation) and dried. The product is free-flowing and readily friable on grinding.

In an alternate, although somewhat less effective embodiment, TSKP can be admixed with a finely divided siliceous material, such as HiSil TM or Cab-O-Sil TM products before or after fine grinding. We have found that addition of powdered siliceous materials, such as HiSil, to improve dry flow properties of the tacky TSKP unexpectedly improved separation of components on air classification. Added siliceous matter is particularly effective in large scale air classifications.

Fine grinding of crude or defatted TSKP can be conducted in any grinder or mill capable of reducing the particle size to about 100 microns or less and providing a gradation of particle size. Commercially available grinding equipment suitable for this purpose includes the Raymond TM hammer mill and the Alpine Kolloplex, Model 160Z TM pin mill. Particle size distribution curve is shown in FIG. I for pin mill ground TSKP (solid line). The finely ground TSKP desirably has a particle size distribution as follows: between 15 and 30 percent is less than 10 microns; 10 to 20 percent is between 10 and 20 microns; 15 to 30 percent is between 20 and 40 microns; 15 to 20 percent is between 60 and 80 microns.

Air classification of TSKP can be conducted with any air classifier capable of separating particles in the 5 to 100 micron range. Typical commercially available equipment found suitable for this purpose include the Walther, Type 150 TM Laboratory Air Classifier and the Alpine Mikroplex, Model 400 MPVI TM Air Classifier. The TSKP may be classified into three fractions, the first fraction being rich in protein, the second fraction being rich in polysaccharides, and the third fraction being rich in mechanical impurities. In a typical classification, powdered crude TSKP, crude TSKP admixed with powdered siliceous matter or defatted TSKP — is classified to remove a 10 to 20 percent fines fraction. This fraction is rich in protein. The coarse fraction is reclassified at a lower air velocity to obtain a fines fraction and a coarse fraction. This coarse fraction may include about 10 to 20 percent of the total weight. If larger than 20 percent, the latter may be recycled at a still lower air velocity to achieve additional separation. Middle fractions obtained in this manner are low in protein and impurities while the last or coarse fractions are low in protein but relatively rich in mechanical impurities. The recovered purified polysaccharide is desirably the middle fractions comprising about 60 to 80 of the fractionated TSKP. The coarse fractions can be reground and reclassified, if desired, to recover additional TSKP polysaccharide. It is desirable throughout the processing to maintain the temperature of the gum below that at which the gum becomes sticky or tacky.

Success of the present purification process depends largely on differential grinding of tamarind components. One unexpected result of the present process is that the addition of siliceous powder (which apparently associates with the fat) or removal of the fat significantly improves the separability of the components by the present process. Apparent advantages of the present process over previous processes are: simplicity, efficiency and economy. Less apparent advantages but of considerable importance for certain end use applications, the present process provides an upgraded product free of extractant, complexing agent or precipitant (when converted without added silica powder).

The following examples illustrate the novel process described herein. They are intended to illustrate and not to limit it in any way.

EXAMPLE I

Crude tamarind seed kernel powder (TSKP) was upgraded according to the present invention as follows One kilogram of crude TSKP was fine ground in a Raymond TM hammer mill containing a screen with 0.025 inch perforations. The powdered product was then air classified using a Walther, Type 150 TM Laboratory Air Classifier. The fine material obtained in each pass was retained; coarse material was recycled at a higher secondary air volume (giving lower air velocity) until a coarse fraction of less than 15 percent was obtained. Conditions and results of the air classifications are tabulated in Table I.

The crude tamarind seed kernel powder (TSKP) prior to air classification contained a total of 18.5% moisture, ash, fiber and fat, 18.0% protein and 63.5% polysaccharide (by difference).

TABLE I

| FRACTION | FEED | 1 | 2 | 3 | 4 | 5 | 6 | 7 |
|---|---|---|---|---|---|---|---|---|
| SEC. AIR VEL, $M^3/HR^b$ | — | 20.0 | 30.0 | 31.5 | 36.5 | 40.0 | 40.0 | 40.0 |
| YIELD, % | — | 14.9 | 11.3 | 18.0 | 14.9 | 11.9 | 16.6 | 12.9 |
| PROTEIN, % | 18 | 45.1 | 34.3 | 13.6 | 8.7 | 7.7 | 8.8 | 12.6 |
| POLYSACCHARIDE, % | 63.5 | 37.6 | 48.9 | 71.8 | 77.5 | 78.8 | 77.5 | 72.9 |

$^b$Secondary air velocity in cubic meters per hour.

Fractions 4, 5 and 6 combined, provided a composite fraction of 43.4 percent yield containing 8.5 percent protein, and 77.7 percent polysaccharide, thus providing 52 percent protein reduction from crude TSKP. This increased the polysaccharide content from a level of less than two-thirds to a level of over three-fourths.

EXAMPLE II

Example I was repeated with 5 percent HiSil 233 ™ added and gave the results tabulated in Table II.

TABLE II

| FRACTION | FEED | 1 | 2 | 3 | 4 | 5 | 6 | 7 |
|---|---|---|---|---|---|---|---|---|
| SEC. AIR VEL, M³/HR | — | 20.0 | 30.0 | 31.5 | 36.5 | 40.0 | 40.0 | 40.0 |
| YIELD, % | — | 16.9 | 21.7 | 21.5 | 10.2 | 5.6 | 11.3 | 10.8 |
| PROTEIN, % | 18 | 39.3 | 19.7 | 7.7 | 6.7 | 7.1 | 10.0 | 14.0 |
| ASH, % | 8 | 14.6 | 9.1 | 4.1 | 3.1 | 3.1 | 3.7 | — |
| FAT (BY ETHER EXTRACTION), % | 7 | 10.6 | 5.2 | 3.1 | 2.6 | 2.5 | 3.0 | 4.0 |
| POLYSACCHARIDE, % | 61 | 29.0 | 58.7 | 77.2 | 79.7 | 79.5 | 75.6 | 70.9 |

Fractions 3, 4, 5 and 6 were combined and provided a composite fraction of 48.6 percent yield having an average protein content of 7.9 percent, a polysaccharide content of 77.9 percent and an average ash content of 3.7 percent. This is a 56 percent reduction in protein content and a very significant increase in polysaccharide content.

EXAMPLE III

Crude TSKP was air classified as follows Two hundred ninety pounds of crude TSKP were fine ground in an Alpine Kolloplex, Model 160Z Pin Mill ™ using a feed rate of 2.0 pounds per minute (lb/min) and a mill speed of 19,000 revolutions per minute (rpm). The powder was then conveyed into an Alpine Mikroplex, Model 400 MPVI, Air Classifier ™ via a vibratory-screw conveyor at a feed rate of 20 lb/min. Classification carried out at a classifier setting of 0.75 separated the feed into a fines portion of 193 lbs (fraction 1) and a coarse portion of 89.5 lbs (fraction 2). Fraction 1, being in excess of 20 percent yield, was recycled at a classifier setting of 0.00 giving a fines fraction of 80 lbs (fraction 1a) and a coarse fraction of 112.4 lbs (fraction 1b). Fraction 2 was then recycled at a setting of 1.0 producing a fines fraction of 54.3 lbs (fraction 2a) and a coarse fraction of 34.5 lbs (fraction 2b). A flow chart of the fraction procedure is illustrated in FIG. II. The results are tabulated in Table III.

TABLE III

| FRACTION | FEED | 1a | 1b | 2a | 2b |
|---|---|---|---|---|---|
| CLASSIFIER SETTING | — | 0.75/0.0 | 0.75/0.0 | 0.75/1.0 | 0.75/1.0 |
| YIELD, % | — | 28 | 39 | 19 | 12 |
| PROTEIN, % | 18 | 22 | 18 | 13 | 15 |
| ASH, % | 3 | 3.3 | 3.1 | 3.1 | 3.7 |
| FAT (BY ETHER EXTRACTION), % | 5.6 | 5.2 | 5.3 | 5.6 | 6.2 |
| POLYSACCHARIDE, % | 63.5 | 63.0 | 66.8 | 71.4 | 67.8 |

EXAMPLE IV

Repetition of the air classification described in Example III was repeated using a mixture of 300 lbs of fine ground TSKP blended with 9.0 lbs of HiSil 233 ™ in a Strong Scott Ribbon Blendor ™ giving the following results:

Air classification was carried out at a feed rate of 17.0 lb/min and a classifier setting of 0.00 and gave a fines fraction of 116 lbs (fraction 1) and a coarse fraction of 189 lbs (fraction 2). Fraction 1 was then recycled at a classifier setting of 0.00 yielding a fines fraction of 29.4 lbs (fraction 1a) and a coarse fraction. The latter was recycled at a classifier setting of 0.50 and a feed rate of 20 lb/min giving a fines fraction of 44.9 lbs (fraction 1b) and a coarse fraction of 41.5 lbs (fraction 1c). Fraction 2 was also recycled at a classifier setting of 0.75 and at a feed rate of 21 lb/min giving a fines fraction of 138.4 lbs (fraction 2a) and a coarse fraction of 47.7 lbs (fraction 2b). A flow chart of the fractionation procedure is illustrated in FIG. III. The fractionation results are tabulated in Table IV. These show that addition of silica powder aids in separation of TSKP components.

TABLE IV

| FRACTION | FEED | 1a | 1b | 1c | 2a | 2b |
|---|---|---|---|---|---|---|
| CLASSIFIER SETTING | — | 0.00/0.00 | 0.00/0.50 | 0.00/0.50 | 0.00/0.75 | 0.00/0.75 |
| YIELD, % | — | 10 | 15 | 14 | 46 | 16 |
| PROTEIN, % | 18 | 41.1 | 31.8 | 15.8 | 9.3 | 14.3 |
| FAT (BY ETHER EXTRACTION), % | 5.6 | 7.2 | 6.6 | 4.9 | 3.7 | 4.9 |
| ASH, % | 6 | 8.0 | 7.0 | 4.7 | 3.3 | 4.5 |
| POLYSACCHARIDE, % | 62.5 | 39.4 | 49.3 | 68.9 | 77.8 | 70.5 |

EXAMPLE V

Crude TSKP was upgraded according to the present invention as follows:

2.3 kilograms (kg) of TSKP was defatted by contact with 6.3 liters (l) of ethylene dichloride for 2 hours at room temperature. Solids were recovered by slow speed centrifugation in a tolhurst ™ centrifuge fitted with a paper-lined, perforated bowl (12 inch). This retained the solids and allowed solvent to pass through. The solids were rinsed twice in the bowl with fresh solvent (1.5 l each time), removed from the bowl and air-dried at ambient temperature for 18 hours. The product was fine ground in the Raymond ™ hammermill as described in Examples I and II, to provide 1.98 kg. of product containing 19.6 percent protein. This was air classified using a Walther, Type 150 ™ air classifier as described in Example I. Results of the fractionation and the analyses of the fractions are shown in Table V.

TABLE V

| FRACTION | FEED | 1 | 2 | 3 | 4 | 5 | 6 | 7 |
|---|---|---|---|---|---|---|---|---|
| SEC. AIR VEL, $M^3$/HR | — | 0.0 | 15.0 | 25.0 | 30.0 | 32.5 | 36.5 | 36.5 |
| YIELD, % | — | 6.6 | 15.7 | 7.7 | 16.4 | 16.6 | 21.0 | 13.2 |
| PROTEIN, % | 19.6 | 52.9 | 49.9 | 23.7 | 4.7 | 3.1 | 3.0 | 9.1 |
| POLYSACCHARIDE, % | 68.0 | 38.1 | 40.4 | 66.0 | 85.2 | 86.8 | 86.9 | 80.8 |

Fractions 4, 5, and 6 were combined and provided a composite fraction of 54 percent yield, containing 3.5 percent protein and 86.35 percent polysaccharide (the protein reduction was 82 percent).

The embodiments of the invention in which an exclusive property or privilege is claimed are defined as follows:

1. A process for purification of crude tamarind seed polysaccharide comprising finely grinding crude tamarind seed kernel powder to a particle size of less than 100 microns, said particle size having a gradation of particle size and air classifying said finely ground crude tamarind seed kernel powder into at least a first fine fraction having an increased protein content and a decreased polysaccharide content and a second coarse fraction having a reduced protein content and an increased polysaccharide content.

2. The process of claim 1 wherein said ground powder has a particle size gradation of from about 5 to 100 microns.

3. The process of claim 2 wherein the finely ground crude tamarind seed kernel powder has a particle size distribution of from 15 to 30 percent is smaller than 10 microns, from 10 to 30 percent is between 10 and 20 microns, from 15 to 30 percent is between 20 and 40 microns and 15 to 20 percent is between 60 and 80 microns.

4. The process of claim 1 wherein said finely ground tamarind material is mixed with finely divided siliceous material prior to said air classification.

5. A process for purification of crude tamarind seed polysaccharide comprising defatting crude tamarind seed kernel powder, finely grinding said defatted tamarind seed kernal powder, finely grinding said defatted tamarind seed kernel powder to a particle size of less than 100 microns, air classifying said finely ground defatted tamarind seed kernel powder into at least a first fraction having an increased tamarind protein content and a decreased tamarind polysaccharide content and into a second fraction having a reduced protein content and an increased polysaccharide content.

6. The process of claim 5 wherein said tamarind seed kernel powder is defatted by solvent extraction prior to said air classification.

7. The process of claim 6 wherein said solvent extraction is carried out utilizing a member of the group consisting of aliphatic hydrocarbons, aromatic hydrocarbons, halogenated hydrocarbons and alcohols.

8. The process of claim 6 wherein said solvent extraction is carried out utilizing ethylene dichloride, hexane, toluene or isopropanol.

9. The process of claim 1 wherein said second fraction is further separated into a fraction having increased polysaccharide content and a fraction having increased mechanical impurities.

* * * * *